(12) United States Patent
Van Eibergen et al.

(10) Patent No.: US 8,895,124 B2
(45) Date of Patent: Nov. 25, 2014

(54) RUBBER COMPOSITION BASED ON AT LEAST ONE EPDM AND A PHASE-CHANGE MATERIAL, PIPE INCORPORATING SAME AND PROCESS FOR PREPARING THIS COMPOSITION

(71) Applicant: Hutchinson, Paris (FR)

(72) Inventors: Arthur Van Eibergen, Montargis (FR);
Benjamin Swoboda, Bois le Roi (FR);
Benoit Le Rossignol, Montargis (FR);
Christophe Dominiak, Varennes-Changy (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 13/949,844

(22) Filed: Jul. 24, 2013

(65) Prior Publication Data
US 2014/0027003 A1    Jan. 30, 2014

(30) Foreign Application Priority Data
Jul. 25, 2012   (FR) ...................................... 12 57217

(51) Int. Cl.
| | | |
|---|---|---|
| B29D 22/00 | (2006.01) | |
| B29D 23/00 | (2006.01) | |
| B32B 1/08 | (2006.01) | |
| C08L 23/16 | (2006.01) | |
| F16L 11/12 | (2006.01) | |
| C09K 5/06 | (2006.01) | |

(52) U.S. Cl.
CPC ................. *F16L 11/12* (2013.01); *C08L 23/16* (2013.01); *C09K 5/063* (2013.01)
USPC ....... 428/36.91; 428/36.9; 524/502; 138/137; 252/73; 264/328.6

(58) Field of Classification Search
USPC ............... 428/36.9, 36.91; 524/502; 138/137; 252/73; 264/328.6
See application file for complete search history.

(56) References Cited

U.S. PATENT DOCUMENTS

| | | |
|---|---|---|
| 4,617,332 A | 10/1986 | Salyer et al. |
| 6,270,836 B1 | 8/2001 | Holman |
| 2006/0124892 A1 | 6/2006 | Rolland et al. |
| 2009/0105394 A1 | 4/2009 | Kitamura et al. |

FOREIGN PATENT DOCUMENTS

| | | |
|---|---|---|
| EP | 0412021 A1 | 2/1991 |
| JP | 62 149334 A | 7/1987 |

OTHER PUBLICATIONS

International Search Report for Application No. FR1257217, dated Mar. 27, 2013.

*Primary Examiner* — Michael C Miggins
(74) *Attorney, Agent, or Firm* — Alston & Bird LLP

(57) ABSTRACT

The present invention relates to a crosslinked rubber composition based on at least one elastomer of ethylene-propylene-diene terpolymer type (EPDM) and on at least one phase-change material (PCM), to a process for preparing this composition and to a multilayer pipe incorporating it. This composition includes at least 100 phr (phr: parts by weight per one hundred parts of elastomer(s)) of at least one phase-change material (PCM), and it is such that said at least one PCM is dispersed in the crosslinked composition and is provided with protection means that are capable of preventing its dispersion therein at a temperature above its melting point, which composition has a breaking strength of greater than 3 MPa and/or an elongation at break of greater than 100%, these properties being measured at 23° C. according to standard ASTM D 412.

18 Claims, 1 Drawing Sheet

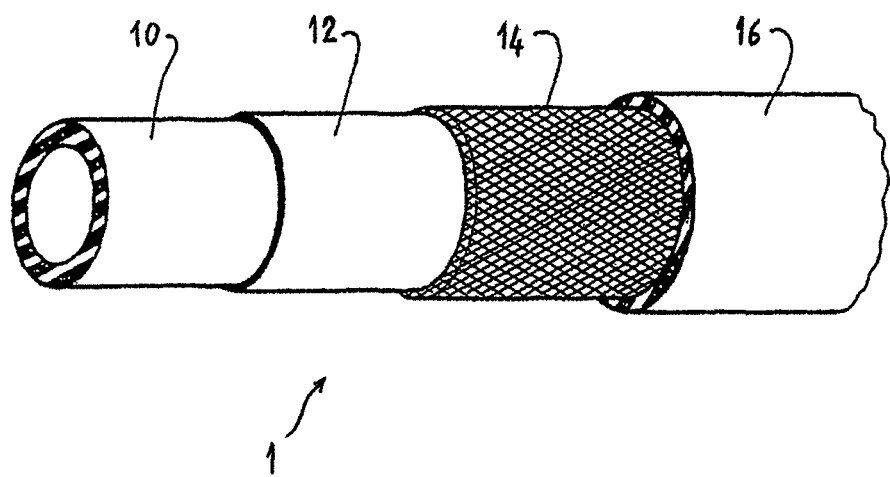

RUBBER COMPOSITION BASED ON AT LEAST ONE EPDM AND A PHASE-CHANGE MATERIAL, PIPE INCORPORATING SAME AND PROCESS FOR PREPARING THIS COMPOSITION

FIELD

The present invention relates to a crosslinked rubber composition based on at least one elastomer of ethylene-propylene-diene terpolymer type (EPDM) and on at least one phase-change material (PCM), to a process for preparing this composition and to a multilayer pipe incorporating it.

BACKGROUND

The incorporation into polymer matrices of PCM materials such as fatty acids, salts or paraffins, especially, to release or absorb heat by a change of state by means of the latent heat of fusion which characterizes these PCMs, has been known for a long time. Specifically, these PCMs have the advantage of passing from the liquid state to the solid state while releasing heat during their crystallization, and conversely of passing from the solid state to the liquid state while absorbing heat during their melting. It is known practice to use these PCMs in powder form with nodules dispersed in a thermoplastic or elastomer matrix, or by encapsulating them in microspheres, for example plastic microspheres, or alternatively by grafting them onto a support, in a nonlimiting manner.

Document U.S. Pat. No. 4,617,332 teaches in example 3 thereof the preparation of a crosslinked rubber composition based on an EPDM in which is dispersed in powder form a PCM of paraffin wax type in an amount ranging from 33 to 66 phr only (phr: parts by weight per one hundred parts of elastomer). A major drawback of this composition lies in its relatively low content of PCM, which does not give it a sufficient change of state mass enthalpy MI in order to absorb and restitute the heat energy necessary to control the temperature of a fluid transported by a pipe.

Document EP-A 1-0 412 021 teaches the mixing in the melt state of amounts greater than or equal to 500 phr of a paraffinic PCM in powder form with a polymeric binder consisting of an EPDM, to obtain crosslinked compositions in which the PCM is not in the dispersed phase state but in the continuous phase state, due to its excessively high content in these compositions and to mixing and crosslinking temperatures above 100° C. which bring about a phase inversion.

As a result of this phase inversion, these PCM-based compositions do not have the flexibility and elasticity mechanical properties required to be used in multilayer hoses subjected to large operating deformations.

SUMMARY

One aim of the present invention is to propose a crosslinked rubber composition based on at least one EPDM and comprising at least 100 phr of at least one PCM which overcomes this phase-inversion drawback despite this very large amount of PCM, while at the same time offering a satisfactory compromise of mechanical and thermal properties, making this composition usable for constituting an intermediate layer of a multilayer pipe conveying a fluid to be heated or cooled.

To this end, a composition according to the invention is such that said at least one PCM is dispersed therein and is provided with protection means that are capable of preventing the dispersion of said at least one PCM in the crosslinked composition at a temperature above its melting point (i.e. in the melt state of the or of each PCM), which crosslinked composition has a breaking strength of greater than 3 MPa and/or an elongation at break of greater than 100%, these properties being measured at 23° C. according to standard ASTM D 412 (i.e. according to the equivalent standard ISO 37).

It will be noted that these means for protecting PCM(s) make it possible to incorporate them during mixing in a very large amount of PCM (greater than or equal to 100 phr, advantageously greater than or equal to 150 phr and even more advantageously greater than 200 phr or even 225 phr) while at the same time managing to conserve them in a discontinuous phase after the processing and crosslinking of the composition, by forming in the continuous phase based on the EPDM(s) dispersed nodules formed from this (these) PCM(s) thus protected. The abovementioned undesirable phase inversion in which the PCM constitutes the continuous phase containing EPDM nodules is thus avoided.

It will also be noted that this very large amount of PCM used in the composition, which advantageously makes it possible to give said composition a change of state mass enthalpy ΔH of greater than 80 J/g and even more advantageously greater than 120 J/g, combined with these high values of breaking strength and of elongation at break achieved for the composition, are evidence of a very satisfactory compromise between thermal and mechanical properties for the compositions of the invention. Specifically, these compositions not only have a high capacity for absorbing or restituting the stored thermal energy, but also acceptable rubbery properties despite this very large amount of PCM, which makes these compositions especially usable for constituting a functional sublayer of a multilayer pipe or hose.

Even more advantageously, the composition according to the invention may have a breaking strength of greater than or equal to 5 MPa (or even greater than or equal to 7 MPa) and/or an elongation at break of greater than 200% (or even greater than 300%), these properties always being measured at 23° C. according to standard ASTM D 412.

Advantageously also, this composition may have a breaking strength of greater than 1 MPa (or even greater than 3 MPa) and/or an elongation at break of greater than 500% (or even greater than 700%), these properties being measured this time at 100° C. according to standard ASTM D 412.

According to another characteristic of the invention, said protection means may comprise capsules enveloping said at least one PCM, and/or supports on which said at least one PCM is adsorbed or grafted. Preferably, said at least one PCM then comprises a paraffin wax, which, in this first case is encapsulated in plastic microspheres forming these capsules and having a melting point above the crosslinking temperature of the composition, and, in this second case is adsorbed or grafted onto these supports which are formed from an inorganic filler in the form of microparticles (i.e. particles with a larger mean transverse dimension of between about 1 μm and 400 μm).

It will be noted that these means for protecting the PCM(s) also make it possible to improve the thermal aging resistance of the composition of the invention, thus preserving its properties for longer than the compositions of the abovementioned documents containing PCM(s) which are neither encapsulated nor supported.

Advantageously, said at least one PCM, said protection means being excluded, may have a melting point of greater than 50° C. and even more advantageously greater than 80° C., unlike the PCMs of the abovementioned documents, which have melting points of less than 70° C., or even less than 50° C.

Advantageously, said composition according to the invention also comprises, in an amount of between 5 and 150 phr, a plasticizing system comprising at least one paraffinic plasticizer.

Even more advantageously, said plasticizing system may consist of said at least one paraffinic plasticizer, which is present in the composition of the invention in an amount of between 8 and 50 phr inclusive.

It will be noted that the Applicant has demonstrated that this plasticizing system contributes towards obtaining said satisfactory mechanical properties (i.e. the abovementioned compromise between breaking strength and elongation at break), despite the very large amount of PCM incorporated into the elastomer matrix of the composition of the invention.

In the present description, the term "rubber composition based on at least one EPDM" means a composition in which the elastomer matrix consists predominantly (i.e. in an amount of greater than 50 phr and preferably greater than 75 phr) of one or more EPDMs. In other words, a composition according to the invention may have its elastomer matrix comprising one or more EPDMs in a total amount of greater than 50 phr and optionally one or more other elastomers in a total amount of less than 50 phr, it being pointed out that the elastomer matrix of the composition according to the invention preferably consists exclusively of one or more EPDMs.

Even more preferentially, this elastomer matrix consists of several said EPDM elastomers which are each derived from ethylidene norbornene (ENB) as diene, of which one, which is predominant in the matrix, has a Mooney viscosity ML(1+8) at 125° C. measured according to standard ASTM D 1646 of between 75 and 90, and of which the other, which is in minor amount in the matrix, has a Mooney viscosity ML(1+4) at 125° C. measured according to standard ASTM D 1646 of between 40 and 55, and is extended with a paraffinic extender oil, the composition being crosslinked with a peroxide.

In general, the compositions of the invention may comprise these PCM(s) in pure form or in combination with fillers (for example metallic or carbon-based fillers, such as graphite, graphene or carbon nanotubes) to increase the thermal conductivity of the or of each PCM, and/or fire retardants, and/or antiaging agents (e.g. UV radiation stabilizers and antioxidants).

According to another aspect of the invention, said crosslinked composition has a Shore A hardness, measured according to standard ASTM D 2240, of between 40 and 100 and preferably between 60 and 90.

A fluid-transfer multilayer pipe or hose according to the invention comprises two radially inner and outer layers and at least one intermediate layer that is radially between these two layers, which consists of a crosslinked composition as defined above, these inner and outer layers preferably also being based on at least one EPDM.

Advantageously, this pipe according to the invention may be included in a heat regulation circuit of a motor vehicle internal combustion engine, for example transferring an engine coolant liquid.

A particularly advantageous example of application of such a pipe for coolant liquid according to the invention incorporating these PCMs concerns the heating of this liquid during the startup of the vehicle engine. Specifically, after the engine has been stopped, the coolant liquid remains for a certain time at a relatively high temperature of about 70 to 90° C., which means that the molten PCM releases heat into this liquid, which is thus already relatively hot when the engine is restarted. This results in a reduction of the carbon dioxide emissions in the exhaust and in overconsumption of fuel, by comparison with what is observed with a cold engine.

A process for preparing a composition according to the invention as defined above essentially comprises:

a) hot mixing in an internal mixer of said at least one elastomer and of said at least one PCM provided beforehand with said protection means, in the presence of a crosslinking system that the composition comprises for obtaining the crosslinkable composition in which is dispersed said at least one PCM, and then b) transformation, for example by injection molding or by extrusion of the crosslinkable composition obtained in a), leading to the forming and crosslinking thereof.

BRIEF DESCRIPTION OF THE DRAWINGS

Other characteristics, advantages and details of the present invention will emerge on reading the description that follows of several implementation examples of the invention, which are given as nonlimiting illustrations, this description being given with reference to the attached drawing, in which:

the single FIGURE is a partial view in perspective with partial cutaways of a pipe according to one implementation example of the invention incorporating said rubber composition.

DETAILED DESCRIPTION

The hose 1 according to the single FIGURE is intended, for example, for transferring a coolant liquid of a motor vehicle internal combustion engine and it comprises, radially from the inside outward:

a tubular rubber inner layer 10 based on at least one EPDM,
a tubular intermediate layer or sublayer 12 consisting of a rubber composition according to the invention based on at least one EPDM and of at least one PCM dispersed in this composition,
an optional tubular reinforcing layer 14, for example based on a textile reinforcer, and
a tubular rubber outer layer 16 also based on at least one EPDM.

The Applicant prepared five crosslinked rubber compositions according to the invention C1 to C5, the respective formulations of which (expressed in phr, i.e. in parts by weight per one hundred parts of the elastomer matrix consisting of the EPDMs used) are collated in Table 1 below, and the mechanical properties of which (measured at 23° C. and at 100° C. according to standard ISO 37 or its equivalent ASTM D 412) are given in Table 2 below.

Each of the compositions C1 to C5 were prepared by hot mixing of its ingredients in an internal mixer (crosslinking system included) to obtain a crosslinkable composition in which is dispersed the PCM, and then by molding this composition leading to its crosslinking and its fashioning in sheet form.

Furthermore, each of these crosslinked compositions C1 to C5 had a Shore A hardness (measured according to standard ASTM D 2240) substantially equal to 80, for use thereof in the sublayer 12 of the pipe 1.

TABLE 1

| Ingredients    | C1  | C2  | C3  | C4  | C5  |
|----------------|-----|-----|-----|-----|-----|
| Vistalon 7500  | 80  | 80  | 80  | 80  | 80  |
| Buna EP G 5567 | 35  | 35  | 35  | 35  | 35  |
| PX 82          | —   | —   | 200 | 225 | 200 |
| Microtek       | 250 | 275 | —   | —   | —   |
| Paraffin oil 1 | —   | —   | —   | —   | 25  |
| Paraffin oil 2 | 10  | 10  | 10  | 10  | —   |

TABLE 1-continued

| Ingredients | C1 | C2 | C3 | C4 | C5 |
|---|---|---|---|---|---|
| Carbon black | 50 | 50 | 50 | 50 | 50 |
| Peroxide crosslinking system | 12.7 | 12.7 | 12.7 | 12.7 | 12.7 |

These ingredients especially had the following characteristics:

Vistalon 7500: EPDM with a Mooney viscosity ML(1+8) at 125° C. equal to 82±5, and mass contents of ethylene and of ENB, respectively, equal to 55.5±2% and 5.7±0.5%;

Buna EP G 5567: EPDM extended with oil (75±6 pce of oil), with a Mooney viscosity ML(1+4) at 125° C. equal to 46±5, and mass contents of ethylene and of ENB, respectively, equal to 66±4% and 5.1±0.8%;

PX 82: PCM of paraffin type grafted onto a support formed from silica microbeads (melting point: 82° C.);

Microtek: PCM of paraffin type encapsulated in PET microspheres (melting point: between 20 and 25° C.).

TABLE 2

| Properties | C1 | C2 | C3 | C4 | C5 |
|---|---|---|---|---|---|
| Characterization at 23° C. | | | | | |
| Breaking strength (MPa) | 3.39 | 3.72 | 6.78 | 7.32 | 6.1 |
| Elongation at break (%) | 330 | 238 | 547 | 350 | 542 |
| 100% elongation modulus (MPa) | 1.8 | 2.4 | 5.0 | 6.2 | 4 |
| Characterization at 100° C. | | | | | |
| Breaking strength (MPa) | 1.62 | 1.95 | 3.63 | 3.47 | 2.02 |
| Elongation at break (%) | 154 | 111 | 738 | 950 | 684 |
| 100% elongation modulus (MPa) | 1.3 | 1.8 | 1.1 | 0.8 | — |

As may be seen in this Table 2 for the properties measured at 23° C., compositions C1 and C2 especially comprising at least 250 phr of encapsulated paraffin as PCM and 10 phr of a paraffinic plasticizer had at this temperature an elongation at break of greater than 200%, or even 300% for C1. As regards compositions C3, C4 and C5 comprising at least 200 phr of supported paraffin as PCM and 10 to 25 phr of a paraffinic plasticizer, they had at 23° C. both a breaking strength of greater than 5 MPa (see in particular C4 whose breaking strength is greater than 7 MPa) and an elongation at break of greater than 300% (see in particular C3 and C5 whose elongation at break is greater than 500%).

As may also be seen in this Table 2 for the properties measured at 100° C., the preferential compositions C3 and C4 according to the invention also had at this temperature a breaking strength of greater than 3 MPa and above all an elongation at break of greater than 700%. In particular, composition C4 incorporating 225 phr of a PCM based on a supported paraffin is particularly advantageous since it had at 100° C. an elongation at break of greater than 900%.

Furthermore, each of these compositions C1 to C5 according to the invention had a change of state mass enthalpy ΔH of greater than 80 J/g and even greater than 120 J/g for composition C4.

In conclusion, these examples show that the use of protected PCMs in compositions C1 to C5 makes it possible to incorporate them during mixing in an amount of PCM of greater than or equal to 200 phr while at the same time managing to conserve them in a discontinuous phase after the processing and crosslinking of compositions C1 to C5, and that this very large amount of PCM combined with the use of paraffinic plasticizers makes it possible to obtain a very satisfactory compromise between thermal and mechanical properties for these compositions C1 to C5, making said compositions usable for constituting a sublayer 12 of a hose 1 in which the temperature of the fluid circulating therein needs to be controlled or to be varied.

The invention claimed is:

1. Crosslinked rubber composition based on at least one elastomer of ethylene-propylene-diene terpolymer type (EPDM) and comprising at least 100 phr (phr: parts by weight per one hundred parts of elastomer(s)) of at least one phase-change material (PCM), characterized in that said at least one PCM is dispersed in the crosslinked composition and is provided with protection means that are capable of preventing its dispersion therein at a temperature above its melting point, which composition has a breaking strength of greater than 3 MPa and/or an elongation at break of greater than 100%, these properties being measured at 23° C. according to standard ASTM D 412.

2. Composition according to claim 1, wherein the composition comprises said at least one PCM in an amount of greater than or equal to 150 phr and preferably greater than or equal to 200 phr.

3. Composition according to claim 1, wherein the composition comprises said at least one PCM in an amount of greater than or equal to 200 phr.

4. Composition according to claim 1, wherein said composition has a breaking strength of greater than or equal to 5 MPa and/or an elongation at break of greater than 200%, these properties being measured at 23° C. according to standard ASTM D 412.

5. Composition according to claim 1, wherein said composition has a breaking strength of greater than 1 MPa and/or an elongation at break of greater than 500%, these properties being measured at 100° C. according to standard ASTM D 412.

6. Composition according to claim 1, wherein said composition has a change of state mass enthalpy ΔH of greater than 80 J/g and preferably greater than 120 J/g.

7. Composition according to claim 1, wherein said at least one PCM, said protection means being excluded, has a melting point above 50° C., for example above 80° C.

8. Composition according to claim 1, wherein said composition is based on an elastomer matrix consisting of several said EPDM elastomers which are each derived from ethylidene norbornene (ENB) as diene, of which one, which is predominant in the matrix, has a Mooney viscosity ML(1+8) at 125° C. measured according to standard ASTM D 1646 of between 75 and 90, and of which the other, which is in minor amount in the matrix, has a Mooney viscosity ML(1+4) at 125° C. measured according to standard ASTM D 1646 of between 40 and 55 and is extended with a paraffinic extender oil, the composition being crosslinked with a peroxide.

9. Composition according to claim 1, wherein said composition has a Shore A hardness, measured according to standard ASTM D 2240, of between 40 and 100 and preferably between 60 and 90.

10. Composition according to claim 1, wherein said composition has a Shore A hardness, measured according to standard ASTM D 2240, of between 60 and 90.

11. Process for preparing a composition according to claim 1, comprising:
 a) hot mixing in an internal mixer of said at least one elastomer and of said at least one PCM provided beforehand with said protection means, in the presence of a crosslinking system that the composition comprises for obtaining the crosslinkable composition in which is dispersed said at least one PCM, and then b) transformation by injection molding or by extrusion of the crosslinkable composition obtained in a), leading to the forming and crosslinking thereof.

12. Composition according to claim 1, wherein said protection means comprise capsules enveloping said at least one PCM, and/or supports on which said at least one PCM is adsorbed or grafted.

13. Composition according to claim 12, wherein said at least one PCM comprises a paraffin wax encapsulated in plastic microspheres which form said capsules and which have a melting point above the crosslinking temperature of the composition.

14. Composition according to claim 12, wherein said at least one PCM comprises a paraffin wax adsorbed or grafted onto said supports, which are formed from an inorganic filler in the form of microparticles.

15. Composition according to claim 1, wherein said composition also comprises, in an amount of between 5 and 150 phr, a plasticizing system comprising at least one paraffinic plasticizer.

16. Composition according to claim 15, wherein said plasticizing system consists of said at least one paraffinic plasticizer, which is present in the composition in an amount of between 8 and 50 phr inclusive.

17. Fluid-transfer multilayer pipe comprising two radially inner and outer layers and at least one intermediate layer which is radially between these two layers, wherein said at least one intermediate layer comprises a crosslinked composition according to claim 1, these inner and outer layers preferably also being based on at least one EPDM.

18. Pipe according to claim 17, wherein said pipe is included in a heat regulation circuit of a motor vehicle internal combustion engine, for example transferring an engine coolant liquid.

* * * * *